(12) United States Patent
Koul et al.

(10) Patent No.: US 10,986,056 B2
(45) Date of Patent: Apr. 20, 2021

(54) TECHNIQUES FOR FILTERING SELECTIVE USERS IN DISTRIBUTION LISTS

(71) Applicant: Oracle International Corporation, Redwood Shores, CA (US)

(72) Inventors: Rohit Koul, Jammu and Kashmir (IN); Gurudutta Ramanathaiah, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 79 days.

(21) Appl. No.: 15/465,973

(22) Filed: Mar. 22, 2017

(65) Prior Publication Data

US 2017/0195270 A1 Jul. 6, 2017

Related U.S. Application Data

(63) Continuation of application No. 12/856,458, filed on Aug. 13, 2010, now Pat. No. 9,660,832.

(51) Int. Cl.
| | |
|---|---|
| *H04L 12/58* | (2006.01) |
| *G06F 16/9535* | (2019.01) |
| *G06Q 10/10* | (2012.01) |
| *G06F 16/9032* | (2019.01) |

(52) U.S. Cl.
CPC .......... *H04L 51/14* (2013.01); *G06F 16/9535* (2019.01); *G06Q 10/107* (2013.01); *H04L 51/12* (2013.01); *G06F 16/90324* (2019.01); *H04L 51/16* (2013.01)

(58) Field of Classification Search
CPC ... H04L 51/14; H04L 51/12; G06F 17/30867; G06Q 10/107
USPC .......................................................... 709/206
See application file for complete search history.

(56) References Cited

U.S. PATENT DOCUMENTS

| | | |
|---|---|---|
| 2003/0061289 A1 | 3/2003 | Clissold et al. |
| 2004/0193692 A1 | 9/2004 | Bottan et al. |
| 2005/0117715 A1* | 6/2005 | Bordia ................. H04L 51/12 379/88.13 |
| 2006/0075040 A1* | 4/2006 | Chmaytelli ......... G06Q 10/107 709/206 |
| 2006/0168068 A1 | 7/2006 | Ziegert |

(Continued)

OTHER PUBLICATIONS

Mailing Lists Management, Sendblaster, http://www.sendblaster.com/help/sendblaster_lists_managing.htm, 2008, 2 pages.

(Continued)

*Primary Examiner* — Kevin S Mai
(74) *Attorney, Agent, or Firm* — Kilpatrick Townsend & Stockton LLP (57) ABSTRACT

Techniques, including systems and methods for distributing electronic messages, are disclosed. In an embodiment, information relating to a message thread is maintained. The information includes information identifying one or more members of a distribution list to be excluded from receiving messages in the message thread. When it has been determined to prevent distribution of the electronic message to one or more members of the distribution list, the electronic message is distributed to members of the distribution list excluding the one or more members to whom distribution is to be prevented. The distributed electronic message may identify the distribution list as an intended recipient.

19 Claims, 6 Drawing Sheets

(56) References Cited

U.S. PATENT DOCUMENTS

| | | | |
|---|---|---|---|
| 2007/0143424 A1 | 6/2007 | Schirmer et al. | |
| 2007/0157203 A1* | 7/2007 | Lim | G06F 9/468 718/100 |
| 2008/0120383 A1 | 5/2008 | Kumar et al. | |
| 2008/0183822 A1* | 7/2008 | Cai | G06Q 10/107 709/206 |
| 2009/0113446 A1 | 4/2009 | Hamilton et al. | |
| 2009/0138559 A1 | 5/2009 | Jones et al. | |
| 2010/0011066 A1* | 1/2010 | Chen | G06Q 10/107 709/206 |
| 2010/0049807 A1* | 2/2010 | Thompson | G06Q 10/107 709/206 |
| 2012/0042019 A1 | 2/2012 | Koul et al. | |

OTHER PUBLICATIONS

Netmailer Overview, Alpha Software http://wiki.alphasoftware.com/Netmailer+Overview 2 pages.

Sendblaster 1.5.5, <URL: http://www.sendblaster.com/>, 1 page.

U.S. Appl. No. 12/856,458, Final Office Action dated Oct. 29, 2012, 25 pages.

U.S. Appl. No. 12/856,458, Final Office Action dated Jan. 30, 2015, 29 pages.

U.S. Appl. No. 12/856,458, Final Office Action dated May 6, 2016, 41 pages.

U.S. Appl. No. 12/856,458, Non-Final Office Action dated May 8, 2012, 24 pages.

U.S. Appl. No. 12/856,458, Non-Final Office Action dated Jun. 5, 2014, 27 pages.

U.S. Appl. No. 12/856,458, Non-Final Office Action dated Sep. 30, 2015, 36 pages.

U.S. Appl. No. 12/856,458, Notice of Allowance dated Jan. 17, 2017, 5 pages.

Huggins, Distribution Lists Really Do Make Life Easier Part II, Feb. 9, 2009, 1 page.

MailList Controller, How to Use Subsets to Create Groups Inside a List, Arclab Software Technologies, 2009 3 pages.

Oric, PostCast Mailing List Management Software, Gate Comm. Software http://www.postcast.com/pub/postcast_whitepaper.pdf, 2003, 7 pages.

* cited by examiner

| messageID | Sender | Receiver | Filter Type | Filter |
|---|---|---|---|---|
| 123456 | ssa@example.com | mancom@abc.com<br>joe@abc.com | Ind. | sss@abc.com |
| 123457 | far@exampe.com | mgrs@xyz.org | Ind. | abc@xyz.org |
| 123458 | joe@domain.com | assocs@domain.com | DL | SEA@domain.com |
| 123459 | manager@abc.com | adpros@abc.com | DL | SF_adpros@abc.com;<br>SD_adpros@abc.com |
| 123460 | ssa@example.com | legal@example.com<br>ssa@example.com | DL | Leg_Sec@example.com |
| 123461 | ssa@example.com | legal@example.com | Hyb. | Vps_leg@example.com<br>joe@example.com |
| 123462 | joe@domain.com | mktng@domain.com | Ind. | amy@domain.com |

Configuration for John Doe:

| Distribution List | Filter | Active |
|---|---|---|
| legal@example.com | smith.joe@example.com | Yes |
| mgmt@example.com | Jr_mgmt@example.com<br>Asst_mgmt@example.com | No |
| mktng@example.com | rmgmt@example.com<br>sue@example.com | Yes |
| ateam@abc.com | carl@abc.com | Yes |
| legal@example.com | adam.scott@example.com | No |

FIG. 9

TECHNIQUES FOR FILTERING SELECTIVE USERS IN DISTRIBUTION LISTS

CROSS-REFERENCES TO RELATED APPLICATIONS

The present application is a continuation of, and claims the benefit of and priority to, U.S. patent application Ser. No. 12/856,458, filed on Aug. 13, 2010, the entire contents of which are incorporated herein by reference for all purposes.

BACKGROUND OF THE INVENTION

Many electronic communications, such as electronic mail messages, benefit from the use of distribution lists. Distribution lists, for example, allow senders of electronic communications to address communications to complete groups of people without having to enter individual addresses for each member of the group. For instance, if a person needs to communicate information to all employees of his or her organization, he or she may prepare an electronic mail message addressed to a distribution list that contains electronic mail addresses for all employees of the organization. Similarly, if a manager desires to communicate information to all employees in his or her department, he or she may prepare an electronic mail message addressed to a distribution list that contains electronic mail addresses for all employees in his or her department. Not only is there time saved by not having to input many individual addresses, but communications appear tidier when tens, hundreds, or even more email addresses are replaced by an address of a distribution list. Moreover, the use of distribution lists allows communications to be directed to specific groups without the sender having to keep track of the members of the group. Thus, distribution lists are especially advantageous for groups that have dynamic membership, such as organizations or departments with a lot of employee turnover.

The conventional use of distribution lists, however, has several shortcomings. In some instances, for example, it may be desirable to exclude one or more recipients from receiving a communication. For instance, someone wishing to plan a surprise birthday party for an employee may wish to send a communication about the party to all the employees except the person for whom the party is being planned. As another example, someone may wish to send a communication about a problematic group member to all members of the group, excluding the problematic member. One way of accomplishing this is to address a communication to every person to whom receipt of the communication is intended. Another way to accomplish this, through the use of some electronic mail clients, is to enter an identifier of a distribution list in a "to:" field of an electronic message and direct the mail client to replace the identifier of the distribution list with identifiers (such as electronic mail addresses) of members of the distribution list. An electronic mail address of the person to whom distribution of the communication is not desired may be deleted from the "to:" field. These methods, however, can be quite cumbersome, especially when many people are intended to receive the communications. In addition, members of a distribution list may themselves be distribution lists and, therefore, finding the electronic mail address of a person may involve multiple replacements of distribution list identifiers with identifiers of the members of the distribution list.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Embodiments of the present invention provide techniques for distributing electronic messages. Techniques, including systems and methods described and suggested herein, include techniques that allow users to utilize distribution lists, but exclude certain members of the distribution lists from receiving messages. When one or more members of a distribution list are excluded from receiving a message addressed to a distribution list, the one or more members may be excluded automatically from future messages in a message thread associated with the message. New members of the same or different distribution lists may be excluded at any point in a message thread. In some instances, members who have been excluded from receiving messages in a message thread may be allowed to receive messages form the thread.

In one embodiment, a computer-implemented method of distributing electronic messages is disclosed. The method may be performed under the control of one or more computer systems configured with executable instructions. The method includes maintaining information relating to a message thread, the information relating to the message thread including information identifying one or more members of a distribution list to be excluded from receiving messages in the message thread. For an electronic message of the message thread addressed to at least the distribution list, a determination, based at least in part on the maintained information relating to the message thread, whether to prevent distribution of the electronic message to one or more members of the distribution list is made. When it has been determined to prevent distribution of the electronic message to one or more members of the distribution list, the electronic message is distributed to members of the distribution list excluding the one or more members to whom distribution is to be prevented. The distributed electronic message may identify the distribution list as an intended recipient.

The one or more computer systems, in an embodiment, include a server computer system having a data store, wherein the electronic message includes metadata identifying one or more additional messages of the message thread. Maintaining the information relating to the message thread may include associating, in the data store, the information identifying one or more members of the distribution list to be excluded with one or more of the identified additional messages. The information identifying the one or more members to whom distribution is to be prevented may be absent from the distributed electronic message. The method may also include receiving a reply to the electronic message, the reply being addressed to at least the distribution list, and distributing the reply to members of the distribution list excluding the one or more members of the distribution list to whom distribution is to be prevented. The information identifying the one or more members to whom distribution is to be prevented may be included in the distributed electronic message and may be encrypted. Maintaining the information relating to the message thread may include encoding the information identifying the one or more members of the distribution list to be excluded in metadata of the electronic message.

In another embodiment, a computer-readable storage medium is disclosed. The computer-readable storage medium, in an embodiment, has instructions for causing one or more computer systems to distribute electronic messages. The instructions include instructions that cause the one or more computer systems to store information relating to a message thread that includes information identifying one or more members of a distribution list to be excluded from receiving at least one message in the message thread; instructions that cause, for an electronic message of the message thread addressed to at least the distribution list, the one or more computer systems to determine, based at least in part on the maintained information relating to the message thread, whether to prevent distribution of the electronic message to one or more members of the distribution list; and instructions that cause the one or more computer systems to, when it has been determined to prevent distribution of the electronic message to one or more members of the distribution list, prevent distribution of the electronic message to the one or more members of the distribution list to whom distribution is to be prevented while distributing the electronic message to other members of the distribution list, the distributed electronic message identifying the distribution list as an intended recipient.

The one or more computer systems may include a server computer system having a data store and the electronic message may include metadata identifying one or more additional messages of the message thread. The instructions that cause the one or more computer systems to store the information relating to the message thread may include instructions that cause the one or more computer systems to associate, in the data store, the information identifying one or more members of the distribution list to be excluded with one or more of the identified additional messages. In an embodiment, information identifying the one or more members to whom distribution is to be prevented is absent from the distributed electronic message. In another embodiment, information identifying the one or more members to whom distribution is to be prevented is present in the distributed electronic message. The instructions may further include instructions that cause the one or more computer systems to receive a reply to the electronic message, where the reply is addressed to at least the distribution list, and instructions that cause the one or more computer systems to distribute the reply to members of the distribution list excluding the one or more members of the distribution list to whom distribution is to be prevented. The information identifying the one or more members to whom distribution is to be prevented may be included in the distributed electronic message. Maintaining the information relating to the message thread may include encoding the information identifying the one or more members of the distribution list to be excluded in metadata of the electronic message. The information identifying the one or more members of the distribution list to be excluded is encrypted.

In yet another embodiment, a computer system for distributing electronic messages is disclosed. The computer system includes one or more processors and memory including executable instructions that, when executed by the one or more processors, cause the one or more processors to distribute electronic messages. In particular, the instructions cause the one or more processors to maintain information relating to a message thread, the information relating to the message thread including information identifying one or more members of a distribution list to be excluded from receiving messages in the message thread; for an electronic message of the message thread addressed to at least the distribution list, determine, based at least in part on the maintained information relating to the message thread, whether to prevent distribution of the electronic message to one or more members of the distribution list; and when it has been determined to prevent distribution of the electronic message to one or more members of the distribution list, distribute the electronic message to members of the distribution list excluding the one or more members to whom distribution is to be prevented, the distributed electronic message identifying the distribution list as an intended recipient.

The computer system, in an embodiment, includes a data store; the electronic message includes metadata identifying one or more additional messages of the message thread; and the executable instructions, when executed by the one or more processors, cause the one or more processors to associate, in the data store, the information identifying one or more members of the distribution list to be excluded with one or more of the identified additional messages. The information identifying the one or more members to whom distribution is to be prevented may be absent from or included in the distributed electronic message. The executable instructions, when executed by the one or more processors, may cause the one or more processors to: receive a reply to the electronic message, the reply being addressed to at least the distribution list; and distribute the reply to members of the distribution list excluding the one or more members of the distribution list to whom distribution is to be prevented. Also, the executable instructions, when executed by the one or more processors, may cause the one or more processors to encode the information identifying the one or more members of the distribution list to be excluded in metadata of the electronic message.

In each of the aforementioned embodiments, or variations thereof, each address of a message thread may be addressed to one or more addresses, including addresses of individuals and/or of distribution lists. The information relating to the message thread may additionally identify one or more addresses additional to the addresses of the message thread and an electronic message of the message thread may be distributed to the one or more addresses additional to the addresses of the message thread. Distribution to the additional addresses of the message thread may be performed in addition to or as an alternative to preventing distribution to one or more members of a distribution list.

For a fuller understanding of the nature and advantages of the present invention, reference should be made to the ensuing detailed description and accompanying drawings.

DETAILED DESCRIPTION OF THE INVENTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

In an embodiment, users are provided the ability to address electronic communications to distribution lists but with the additional ability to select members of the distribution lists to whom distribution of electronic communications should be excluded. Information regarding the excluded member(s) of a distribution list is maintained for a message thread so that future replies and other messages in the thread may also be distributed in a manner that excludes the members that were originally excluded. Recipients of messages addressed to a distribution list may or may not be provided the ability to see the members to whom distribution was prevented. For a fuller understanding of the nature and advantages of the present invention, reference should be made to the ensuing detailed description and accompanying drawings.

Figure 1:
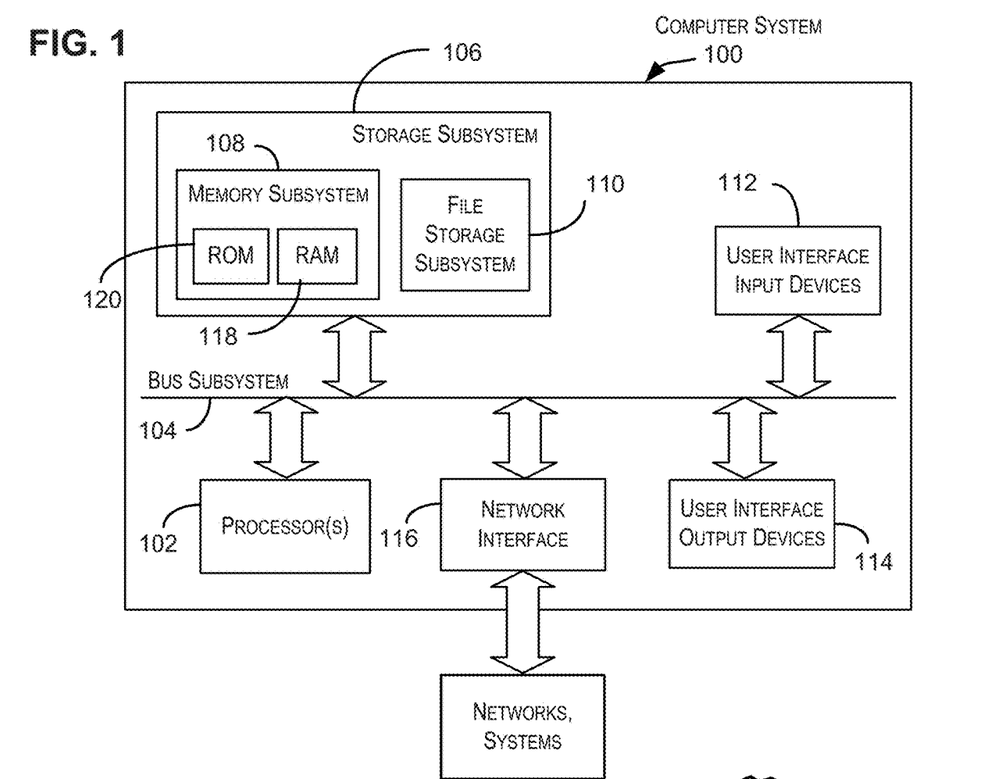
FIG. 1 is a simplified block diagram of a computer system that may be used to practice an embodiment of the present invention.

FIG. 1 is a simplified block diagram of a computer system 100 that may be used to practice an embodiment of the present invention. The computer system 100 may be used, for instance, to compose, send, distribute, and/or receive electronic messages. Computer system 100 may serve as a processing system and/or a client system depicted in FIG. 2. As shown in FIG. 1, computer system 100 includes a processor 102 that communicates with a number of peripheral subsystems via a bus subsystem 104. These peripheral subsystems may include a storage subsystem 106, comprising a memory subsystem 108 and a file storage subsystem 110, user interface input devices 112, user interface output devices 114, and a network interface subsystem 116.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Network interface subsystem 116 provides an interface to other computer systems, networks, and portals. Network interface subsystem 116 serves as an interface for receiving data from and transmitting data to other systems from computer system 100. The network interface subsystem 116 may be used, for example to send and receive electronic messages over a network.

User interface input devices 112 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 100. A user may use an input device to compose content for electronic messages and/or to specify and/or exclude recipients, in accordance with various embodiments.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100. Content of electronic messages may be displayed using output devices 114.

Storage subsystem 106 provides a computer-readable medium for storing the basic programming and data constructs that provide the functionality of the present invention. Software (programs, code modules, instructions) that, when executed by a processor, provide the functionality of the present invention may be stored in storage subsystem 106. These software modules or instructions may be executed by processor(s) 102. Storage subsystem 106 may also provide a repository for storing data used in accordance with the present invention, for example, the data stored in the diagnostic data repository. For example, storage subsystem 106 provides a storage medium for persisting one or more ontologies. Storage subsystem 106 may comprise memory subsystem 108 and file/disk storage subsystem 110.

Memory subsystem 108 may include a number of memories including a main random access memory (RAM) 118 for storage of instructions and data during program execution and a read-only memory (ROM) 120 in which fixed instructions are stored. File storage subsystem 110 provides persistent (non-volatile) storage for program and data files, and may include a hard disk drive, a floppy disk drive along with associated removable media, a Compact Disk Read-Only Memory (CD-ROM) drive, an optical drive, removable media cartridges, and other like storage media.

Computer system 100 can be of various types including a personal computer, a portable computer, a workstation, a network computer, a mainframe, a kiosk, a mobile device, a tablet device, and a server or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Figure 2:
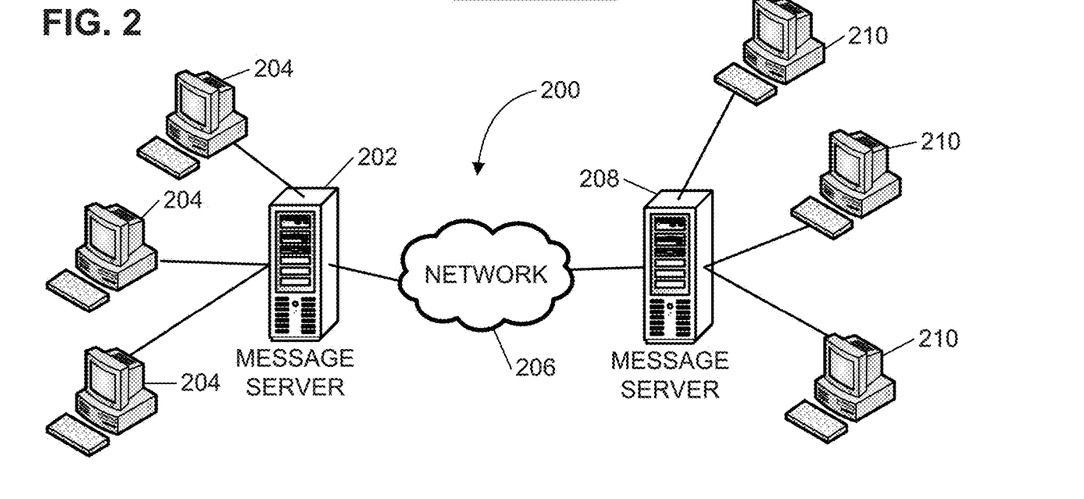
FIG. 2 shows an environment in which the invention may be practiced in accordance with an embodiment.

FIG. 2 shows an environment 200 in which embodiments of the invention may be practiced. As noted, components of the environment 200 may utilize a computing system, as described above in connection with FIG. 1, although other computing systems may be used. As shown in the drawing, the environment 200 includes a message server 202 accessible by a plurality of client devices 204. In an embodiment, the message server 202 is a device operable to receive and forward messages generated by users of the client devices 204. In an embodiment, the message server 202 maintains a plurality of accounts for users of the client devices 204. The accounts may be organized under a common domain name, although multiple domain names may be used.

The message server 202, in an embodiment, includes storage for organizing messages of the various accounts of the message server 202. The client devices 204 may be any devices operable to send and receive messages. Examples include desktop computers, notebook computers, mobile devices, tablet computing devices and, generally, any computing device which may be used to send and receive messages using the message server 202. As an example of how the message server 202 may operate, a user may use one of the client devices 204 to compose and send a message addressed to one or more addresses. The message is then received by the message server 202 and routed appropriately. For any of the addresses directed to accounts maintained by the message server 202, the message server 202 may store a copy of the message in a folder associated with a user associated with that address. If the message is addressed to an account not maintained by the message server 202, the message server 202 may forward a copy of the message appropriately. For instance, the message server 202 may utilize a network 206 such as the Internet or generally any communications network to send the message to another message server 208 which maintains another set of accounts of different users. The message server 202 may also send messages to multiple other message servers. Any of the message servers may forward messages to users appropriately. A message server may, for instance, send content of a message to a user upon receiving a user request for the message.

In an embodiment, the message server 202 is operable to utilize one or more distribution lists. A distribution list is an association of one or more identifiers. The associated identifiers may include identifiers such as electronic mail addresses of individual users or may be identifiers of other distribution lists. In an embodiment the distribution list has its own identifier. A message may be addressed to the identifier of the distribution list in order to specify that the message should be sent to all identifiers associated together by the distribution list. For example, a distribution list may have the identifier of "team" or team@example.com, and may associate the addresses john@example.com, jane@example.com, and sue@example.com. In this instance, a message addressed to "team" or "team@example.com" would, upon dispatch, be sent to users associated with the john@example.com, jane@example.com, and sue@example.com addresses. Similarly, if the "team" or team@example.com distribution list also includes patents example.com, another distribution list, the message would be sent to all users associated by the patents@example.com distribution list. It should be noted that, while the present disclosure makes use of electronic mail addresses for the purpose of illustration, distribution lists may be used to associate users of various messaging systems. Further, distribution lists may associate users of different messaging systems. For example, a distribution list may associate together both electronic mail addresses and short message service (SMS) addresses.

Figure 3A:
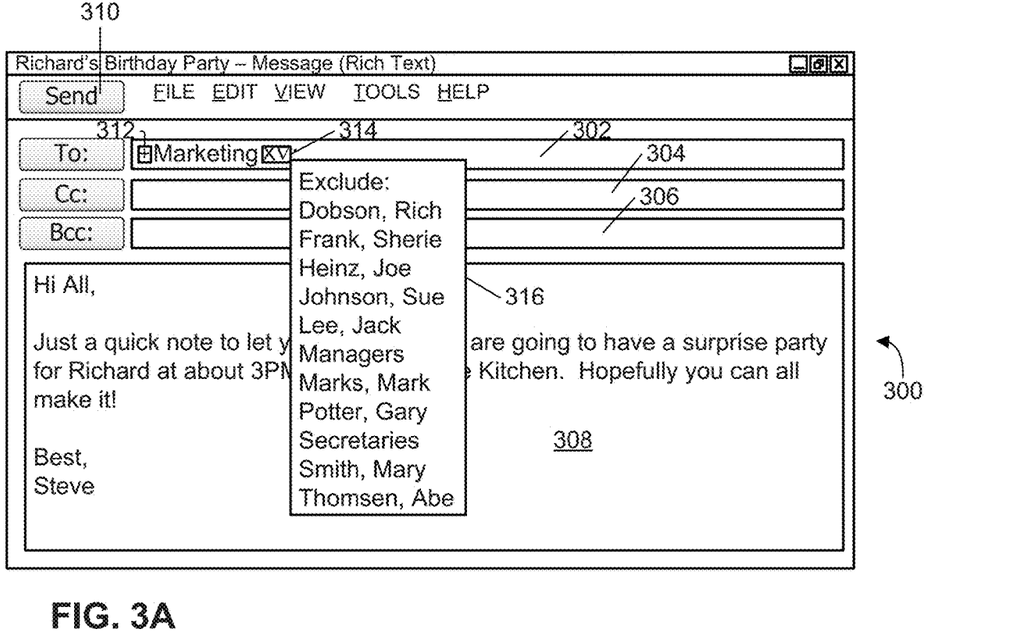
FIGS. 3A and 3B show illustrative examples of a message client interface that may be used to compose and send messages in accordance with an embodiment.
Figure 3B:
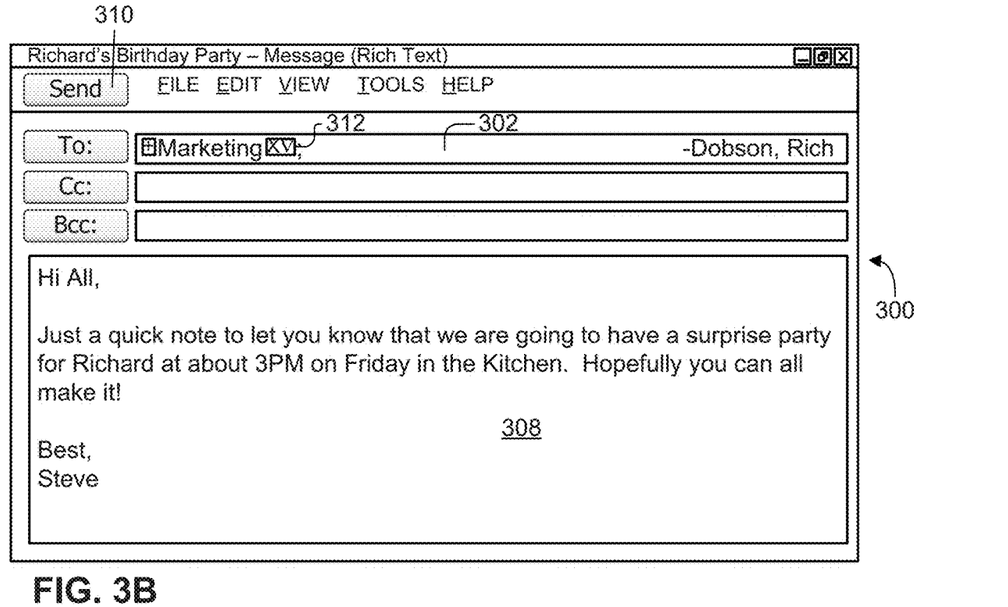

FIGS. 3A and 3B show an illustrative example of an interface which may be used to compose messages in accordance with an embodiment. The interface 300 may be provided in a variety of ways. For instance, in an embodiment, the interface 300 is provided using an electronic mail application executing on a client device. The interface 300 may also be provided in other ways such as through a website accessible over a network such as the Internet. A display of the interface 300, and generally interfaces described herein and variations thereof, may be displayed on an output device, such as an output device described above. Generally, the interface page 300 may be provided in any suitable manner.

Beginning with FIG. 3A, the interface 300 includes a plurality of fields for defining recipients of a message. For instance, interface 300 includes a "To:" field 302, a "cc:" field 304 and a "bcc:" field 306. The "To:" field 302 in an embodiment is an interface element that allows users to specify one or more recipients of a message. For instance, a user may type in electronic mail addresses for one or more users, user names for one or more users, and/or identifiers of one or more distribution lists. Similarly, the "cc:" field 304 is an interface element that allows a user to appropriately specify one or more users or one or more individual recipients, and/or distribution lists. The "bcc:" field 306 in an embodiment, operates similarly to the "To:" field 302 and "cc:" field 304. However, entry of an identifier of a recipient into the "bcc:" field indicates that one or more users associated with the identifier should receive a message, but that messages sent to users associated with identifiers in the "To:" and/or "cc:" fields lack an indication that users identified by the identifier in the "bcc:" field also received the message. In other words, the "bcc:" field may be used to specify recipients who receive messages, but who are not identified as recipients in the received messages. Recipients of messages, in an embodiment, do not see the identities of users that were specified in a "bcc:" field, although it is possible to configure systems the operate otherwise.

In an embodiment, the interface also includes a message pane 308 which, in an embodiment, is a portion of the interface 300 that allows users to input content of a message. Content of the message may include text, audio, video, content with embedded hyperlinks and/or executable scripts, or generally any content which may be sent from one user to another. For instance, in an embodiment, a user may position a cursor inside the message pane 308 and type in, using a keyboard or other suitable device, text of a message. In an embodiment, interface 300 includes a send button 310. Selection of the send button 310 by a user in an embodiment causes a composed message to be sent to any recipient specified in the "To:" field 302, "cc:" field 304 and/or "bcc:" field 306.

As discussed above, embodiments of the present invention incorporate distribution lists. Accordingly, in an embodiment, a user is able to input identifiers of one or more in distribution lists into any of the "To:" field 302, "cc:" field 304 and/or "bcc:" field 306. In the example shown in FIG. 3A, for instance, a user has entered the word "marketing" which, in this example, corresponds to a distribution list identified by a "marketing" username. The distribution list, for example, may associate one or more electronic mail addresses of members of an organization's marketing department. The marketing distribution list in this example may also associate subdivisions of the marketing department, each identified with their own distribution lists, such as managers, secretaries, and others. In an embodiment, when a distribution list is input into one of the "To:" fields, "cc:" fields and/or "bccs:" fields, an expansion interface element 312 appears proximate to the identifier of the distribution list. In an embodiment, an expansion element is an interface element associated with a distribution list that is selectable by a user in order to replace a corresponding distribution list with a list of identifiers associated together by the distribution list. In this example, the expansion element 312 is a boxed plus sign which a user may select in order to replace the "marketing" identifier of the distribution list with identifiers associated together by the distribution list. For instance, selection of the expansion element 312 may cause the word marketing to be replaced with identifiers of subdivisions of the marketing distribution lists, each with their own distribution lists.

In an embodiment, the interface 300 includes an exclusion interface element 314 which appears proximate to identifiers of distribution lists input into one of the address fields. An exclusion element, in an embodiment, is an interface element that facilitates user selection of one or more identifiers associated by a distribution list. Selection of one or more identifiers by a user indicates that a message addressed to a distribution list should not be sent to users associated with the selected identifiers. In the illustrative example shown, the exclusion element appears as a drop-down interface element proximate to the "marketing" identifier of the "marketing" distribution list.

As shown in FIG. 3A, the exclusion element 314 has been selected and a drop-down box 316 showing possible identifiers for selection has appeared. The drop-down box 316, in this example, includes identifiers that are associated together by the marketing distribution lists. In this example, the identifiers include identifiers of individuals such as Rich Dobson and Sherie Frank as well as other distribution lists such as managers and secretaries. Each of the individuals listed in the drop-down box 316, in this example, are associated with one or more electronic mail addresses. The appearance of the exclusion element 314 and/or the names associated therewith may appear upon receiving information from a server identifying the identifiers associated by the distribution list. For instance, if a user types "marketing" into one of the recipient fields, an electronic request may be sent for the identifiers associated with the "marketing" distribution list and a list of identifiers may be provided in response. In an embodiment, a user may select any of the identifiers in the drop-down box 316 in order to specify that the message should not be sent to any of the selected identifiers.

Accordingly, FIG. 3B shows the interface 300 in a state after a user has selected an identifier to exclude. In this particular example, the identifier for Rich Dobson has been selected and the drop-down box 316 shown in FIG. 3A has disappeared. In order to indicate to the user that one or more identifiers have been selected, those identifiers are shown in the address fields in which they were selected proximate to a minus sign. Thus, the string "-Dobson, Rich" appears on the right hand side of the "To" field 302. Thus, in an embodiment, when the user selects the send button 310, the message will be sent to all members of the marketing distribution list except for Rich Dobson. Specifically, messages will be directed to all electronic mail addresses associated by the marketing distribution list except for any electronic mail addresses associated with the employee, Rich Dobson.

Variations of the illustrative example of the interface shown in FIGS. 3A and 3B are contemplated as being within the scope of the present disclosure. For instance, in an embodiment, an exclusion element may appear for each distribution list specified in any of the recipient fields. As an alternative, an exclusion element may operate collectively for some or all distribution lists specified in the recipient fields. Also, exclusion elements may be provided to users only for distribution lists for which an application providing the interface has stored or has received identifiers associated together by the distribution lists.

As another example of a variation contemplated as being within the scope of the present disclosure, one or more exclusion lists may be pre-configured by users (message senders) using a separate interface. For instance, in an embodiment, a user may log into an electronic mail system to create and manage exclusion lists for distribution lists.

Figure 4:
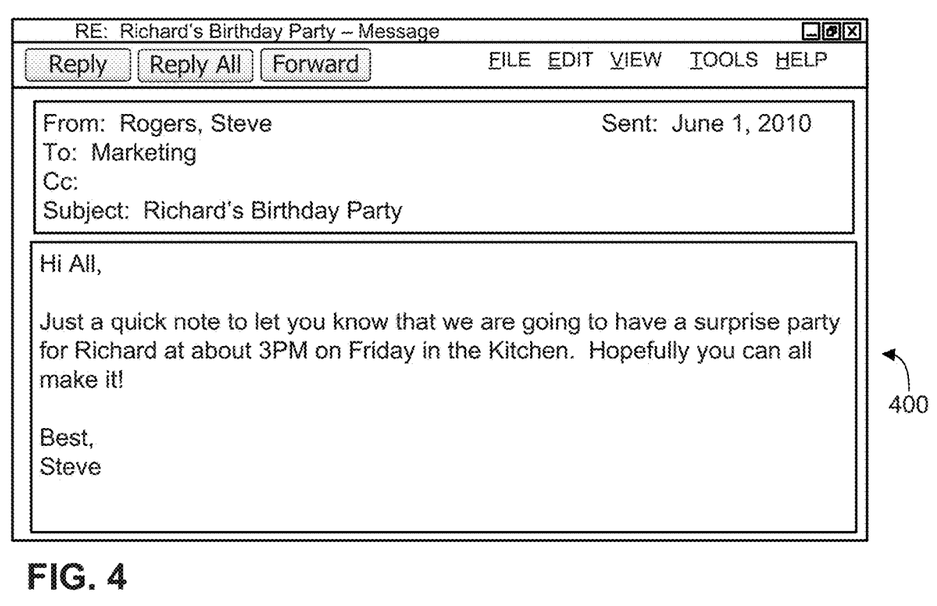
FIG. 4 shows an illustrative example of a message client interface that may be used to display received messages in accordance with an embodiment.

FIG. 4 shows an illustrative example of an interface which may be utilized in order to display a message received, in accordance with an embodiment. The interface 400 may be provided, utilizing the same application that provided the interface shown in FIGS. 3A and 3B, although it may be provided in another manner such as on a web page or by using a different mail client than one that was used in accordance with FIGS. 3A and 3B. As shown in the example in FIG. 4, the interface 400 includes the message that was composed in the message pane 308 of FIGS. 3A and 3B and also identifies any identifiers that were specified in the "To:" field 302 and "cc:" field 304. The interface 400 also shows the identity of the user who sent the message—in this example, Steve Rogers—or the user on whose behalf the message was sent. In this particular example, the interface 400 shows that the message was sent to the marketing distribution list by showing "Marketing" proximate to "To:" above the content of the message. In this manner, the recipient knows that the message was sent to a group of people (in this example a marketing department). Also in this example, the members excluded from distribution are not identified. In this manner, recipients of the message do not see whether any members of the distribution list have been excluded. A message sender intending to alert others that one or more people and/or lists have been excluded from distribution may include a statement identifying excluded recipients and/or lists. For instance, the user who sent the message shown in FIG. 4 may include "P. S. Richard was excluded from receiving this message, so please keep it secret."

Figure 5:
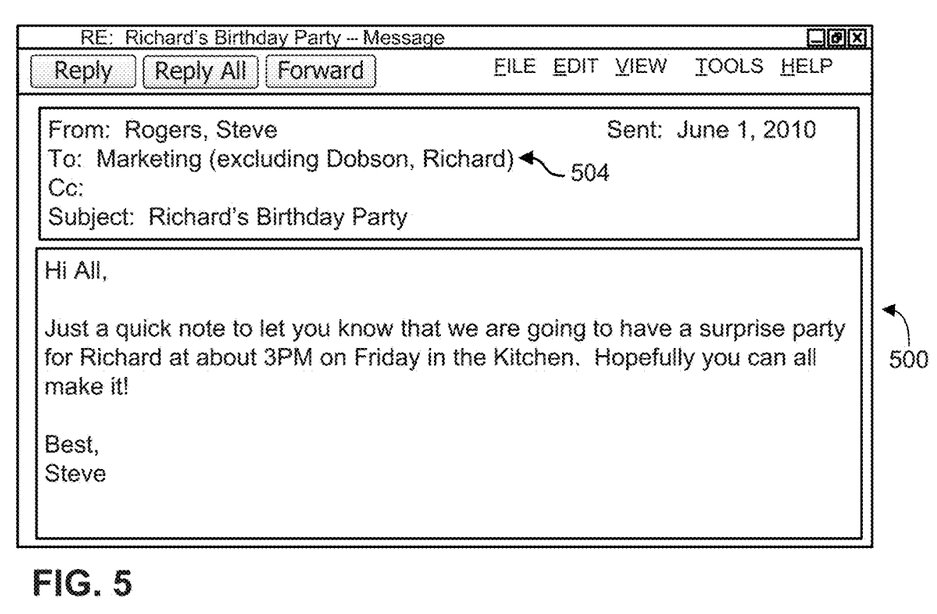
FIG. 5 shows another illustrative example of another message client interface that may be used to display received messages in accordance with an embodiment.

FIG. 5 shows another embodiment of an interface 500 which may be used to show to a user a message received, in accordance with an embodiment. In the example shown in FIG. 5, the interface page is similar to the interface 400 described above with a difference being that the members excluded from distribution are identified in a header portion of the message. Thus, in this example, the header portion of the interface 500 shows that the message was sent to all addresses associated by the marketing distribution list excluding Rich Dobson. In an embodiment, whether recipients are able to see who was excluded from receiving a message may be selectable by a sender of the message. For instance, a checkbox or other interface element may appear upon selection of one or more identifiers to be excluded to enable the user to toggle between allowing recipients to see whether recipients have been excluded or not. Also, instead of identifying the identity of the users and/or lists excluded from distribution, an interface may simply identify that one or more users and/or lists have been excluded, without providing specific identities. In this manner, specific identities of excluded users and/or lists are not revealed, but recipients know to be careful to include certain people in their replies.

Figure 6:
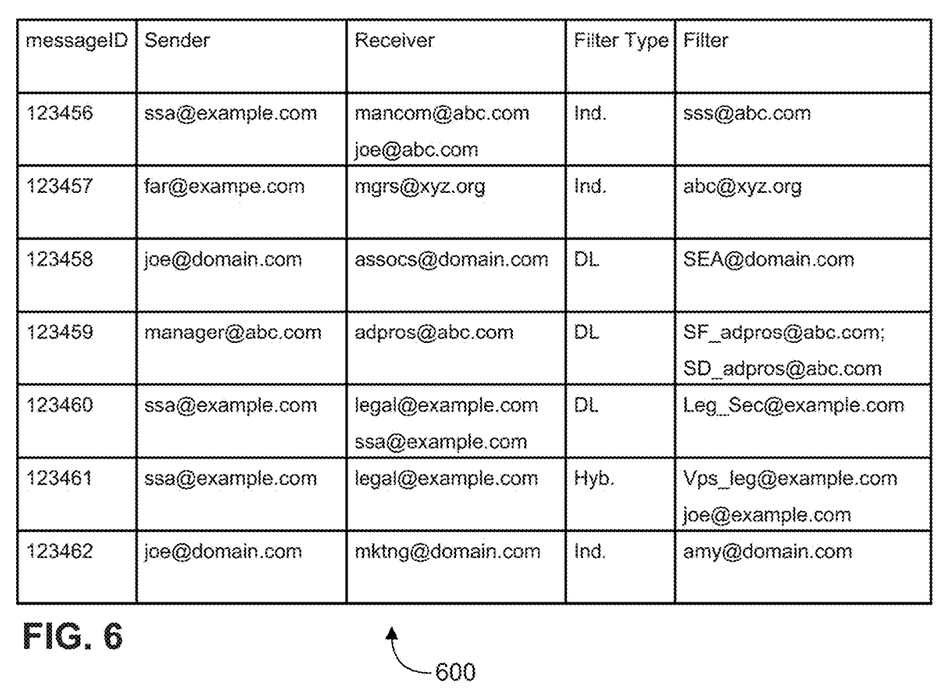
FIG. 6 shows a table which may be used to associate messages with filters associated with the messages in accordance with an embodiment.

Various systems and may be employed to implement various embodiments of the invention disclosed herein, and variations thereof. FIG. 6, for example, shows an illustrative example of a portion of a table 600 which may be used to associate messages with filters associated with the messages in accordance with an embodiment. The table 600 shown in FIG. 6, in this example, represents a data structure utilized by a message server to store information about filters used to exclude users of distribution lists from receiving messages sent to the distribution lists.

In an embodiment, the table 600 includes a row for each of a plurality of message identifiers listed in a far left column of the table 600 having the heading "messageID." In an embodiment, a message identifier is a unique identifier of a message stored as metadata in an electronic message. For instance, in electronic mail messages, a "message-ID" field in metadata often resembles electronic mail addresses, such as "9609171955.AA2432@example.com." For the purposes of illustration, the message identifiers in the table 600 are integer values. In an embodiment, a message identifier of a message is assigned by a client (user) device used to send the message, although identifiers may be assigned by other devices, such as by a server. In addition, metadata of a message may store information that associates message identifiers of a message thread in a hierarchical manner that identifies the relationships of messages to one another. A message thread, in an embodiment, is a set of messages related to one another such that each message is a reply of another message in the thread and such that each message is related, at least indirectly, to an original (first) message of the thread. Such information may be stored in a "References" field of an electronic mail message. For instance, if an electronic mail message is in reply to another electronic mail message, the reply may include a message identifier of the message (parent message) to which the author is replying. The manner in which the message identifier of the parent message is stored in the reply, in an embodiment, indicates that the reply is in response to the parent. If a message thread includes many replies, then message identifiers of previous messages in the thread may be included in each reply in a manner that identifies the messages' relationship to one another. Generally, each message in a thread only includes information about the thread that was available at the time the message was generated. In an embodiment, a message identifier of a message is added to the table 600 when the message includes a filter, where a filter is information that identifies one or more members of one or more distribution list to whom distribution of a message addressed to a distribution list should be prevented.

The table 600, in an embodiment, includes various columns for organizing information relating to message identifiers stored in the table. For instance, a column labeled "Sender" is included to store identifiers of senders of messages. Similarly, a column labeled "Receiver" is included to store identifiers of receivers identified in messages. It should be noted that the specific configuration of the table 600 is provided for the purpose of illustration, and that other configurations for using tables or other structures to organize relevant data may be used in accordance with various embodiments.

In an embodiment, filters may be of several filter types. The filter type, in an embodiment, is a category of filter that is based at least in part on whether the filter specifies exclusion of distribution to individual addresses (identified in the table 600 as an "Ind." Filter), whether the filter specifies exclusion of distribution to a distribution list (identified in the table 600 as a "DL" filter), or whether the filter applies to both individual addresses and distribution lists (identified in the table 600 as a "Hyb." Filter). Accordingly, a column labeled "Filter Type," in an embodiment, stores information identifying a type of filter. A "Filter" column in the table 600 stores specifics of filters. In an embodiment, values in the "Filter" column are identifiers of recipients and/or distribution lists, although other values that are associated with members of distribution lists may be used.

Each row in the table 600 corresponds to a message identified in the intersection of the row and the "messageID" column of the table. For instance, looking at the first row below the row of headings, the first row corresponds to a message having an identifier of "123456" that was sent by ssa@example.com to the distribution list mancom@abc.com and the individual address joe@abc.com with an individual type filter specifying that the message should not be distributed to sss@abc.com, a member of the mancom@abc.com distribution list. Similarly, the third row of the table 600 shows a message identified by 123458 sent by joe@domain.com to the distribution list assocs@domain.com with a distribution list type filter specifying exclusion of the SEA@domain.com distribution list, a member of the assoc@domain.com distribution list. As yet another example, the sixth row of the table 600 shows a message identified by 123461 sent by ssa@example.com to legal@example.com using a hybrid-type filter specifying exclusion of the Vps_leg@example.com distribution list and the individual address of joe@example.com, both members of the legal@example.com distribution list. Other examples are provided in the drawing.

In an embodiment, the table 600 (or variations thereof, or other data structures) may be used to apply filters throughout a message thread. In an embodiment, when a server receives a message, the server may determine whether any of the members of the message thread including the message are identified in the table 600. Determining whether members of the message thread are in the table 600 may be performed, in one example, by referencing messages listed as "references" in a message header in the table 600. If one or more of messages of the message thread are identified in the table 600, then corresponding filters are applied to the message before the message is forwarded to recipients. Further, if the received message includes many identifiers of messages referenced in the table 600, the applicable filters may be aggregated and distribution of the received message, in an embodiment, will be prevented to all addresses in the aggregation of applicable filters.

As an example, if the server determined that the message having identifier 123456 is in the thread of a received message, then the server would forward the received message to specified recipients except for sss@abc.com, as specified in the filter for the 123456 message. Similarly, if other messages were identified as being in the received message's thread, filters applicable to those messages would apply to distribution of the received message. In this manner, when a user specifies a filter for a message, in an embodiment, the filter will apply to future messages in the message thread. Thus, the user who specified the filter can ensure that future messages of the thread will likely not include the filtered recipients.

Figure 7:
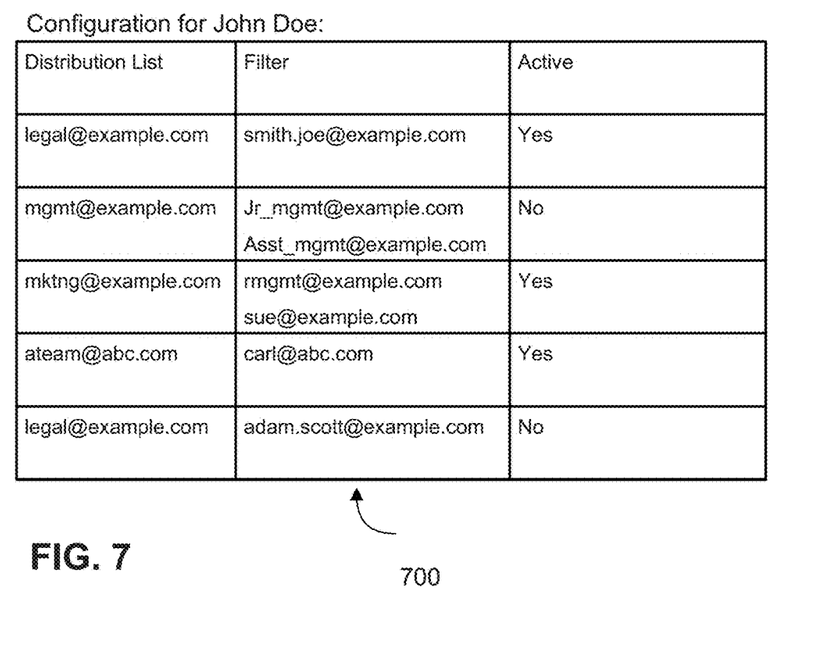
FIG. 7 shows a table which may store filters for particular users in accordance with an embodiment.

FIG. 7 shows another illustrative example of a table 700 which may store information related to filters for particular users in accordance with an embodiment. As with the table shown in FIG. 6, the table 700 shown in FIG. 7 may be stored by a server that is used to send messages. The table 700, or variations thereof, may be used instead of or in addition to the table 600 shown in FIG. 6, or variations thereof. The table 700, in an embodiment, is used in order to provide users the ability to maintain user-specific filters. Accordingly, each user may have a table configured similarly to the table 700 stored at a server or otherwise. In the illustrative example provided in FIG. 7, the table 700 is a table for a user named John Doe.

As with the table shown in FIG. 6, the table 700 of FIG. 7 includes a plurality of columns for organizing information stored by the table. In this example, the table 700 includes a "Distribution List" column which corresponds to identifiers of distribution lists. A "Filter" column includes information specifying addresses of recipients of a distribution list to whom distribution of messages should be prevented. An "Active" column identifies whether a corresponding filter for the user is active or not, that is, whether the corresponding filter should be applied to a message addressed to a distribution list. In FIG. 7, the values in the "Active" column are "Yes" or "No," although other values, such as Boolean values, may be used.

In the example of FIG. 7, each row of the table 700 corresponds to a different distribution list/filter pair. In other words, each row of the table 700 includes a row for each unique combination of distribution list and filter. For example, the first row of the table 700 and last row each correspond to a distribution list identified by legal@example.com. However, the first row includes a filter specifying exclusion of smith.joe@example.com while the last row includes a filter specifying adam.scott@example.com. A new row may be added to the table 700 each time John Doe sends a message addressed to a distribution list with a filter applied to the distribution list. In another embodiment, the table 700 includes a row for each distribution list available to John Doe, as determined by a mail server used to maintain an electronic mail account for John Doe.

In an embodiment, when a user dispatches a message addressed to a distribution list, a server accesses a table for the user and determines whether any filters apply to the distribution list. Determining whether any filters apply to the distribution list may include referencing a distribution list identified in the message with the table 700 to determine whether any corresponding filters with a corresponding "Yes" in the active column apply. For instance, using the example of FIG. 7, if a user addresses a message to mgmt@example.com, a server may determine whether any entries in the table 700 correspond to the mgmt@example.com. Upon detecting mgmt@example.com in the second row, the server may determine whether the value in the "Active" column in the second row is "Yes" or "No." If the value is "Yes," then, in an embodiment, the server forwards the message to the members of the distribution list mgmt@example.com other than the filtered addresses, in this instance, Jr_mgmt@example.com and Asst_mgmt@example.com, as determined from the intersection of the "Filter" column with the second row. Similarly, if the value is "No," then the message is simply forwarded to all members of the mgmt@example.com distribution list, unless any other active filters would otherwise prevent distribution. For instance, if the received message was also addressed to legal@example.com (corresponding to the first row of the table 700), and the address smith.joe@example.com was a member of both the legal@example.com distribution list and the Jr_mgmt@example.com distribution lists, in an embodiment, distribution of the message to an account associate with smith.joe@example.com would be prevented because at least one distribution list has an active filter specifying smith.joe@example.com, according to the table 700. Generally, as with the table 600 described above in connection with FIG. 6, the table 700 shown in FIG. 7 may be referenced for each distribution list identified as recipients in the received message.

In an embodiment, users are able to configure their filters using a user interface provided to users. The user interface may be provided, for example, in a mail client application executing on a client device, or an interface provided on a web page. Users, in an embodiment, are allowed to specify which message identifiers should be excluded for distribution lists and may specify whether filters are currently active or not. When users specify configurations for their filters, tables similar to the table shown in FIG. 7 may be stored locally or on a server for the user. In this manner, users may configure complicated filters that are saved and only used when users, through user input, specify that the filters are active. In an embodiment, when a user specifies a distribution list in a recipient field of a messaging application, a determination may be made whether the user has configured any filters for the distribution list and may provide the user an opportunity to change whether the filter is currently active or not active.

Figure 8:
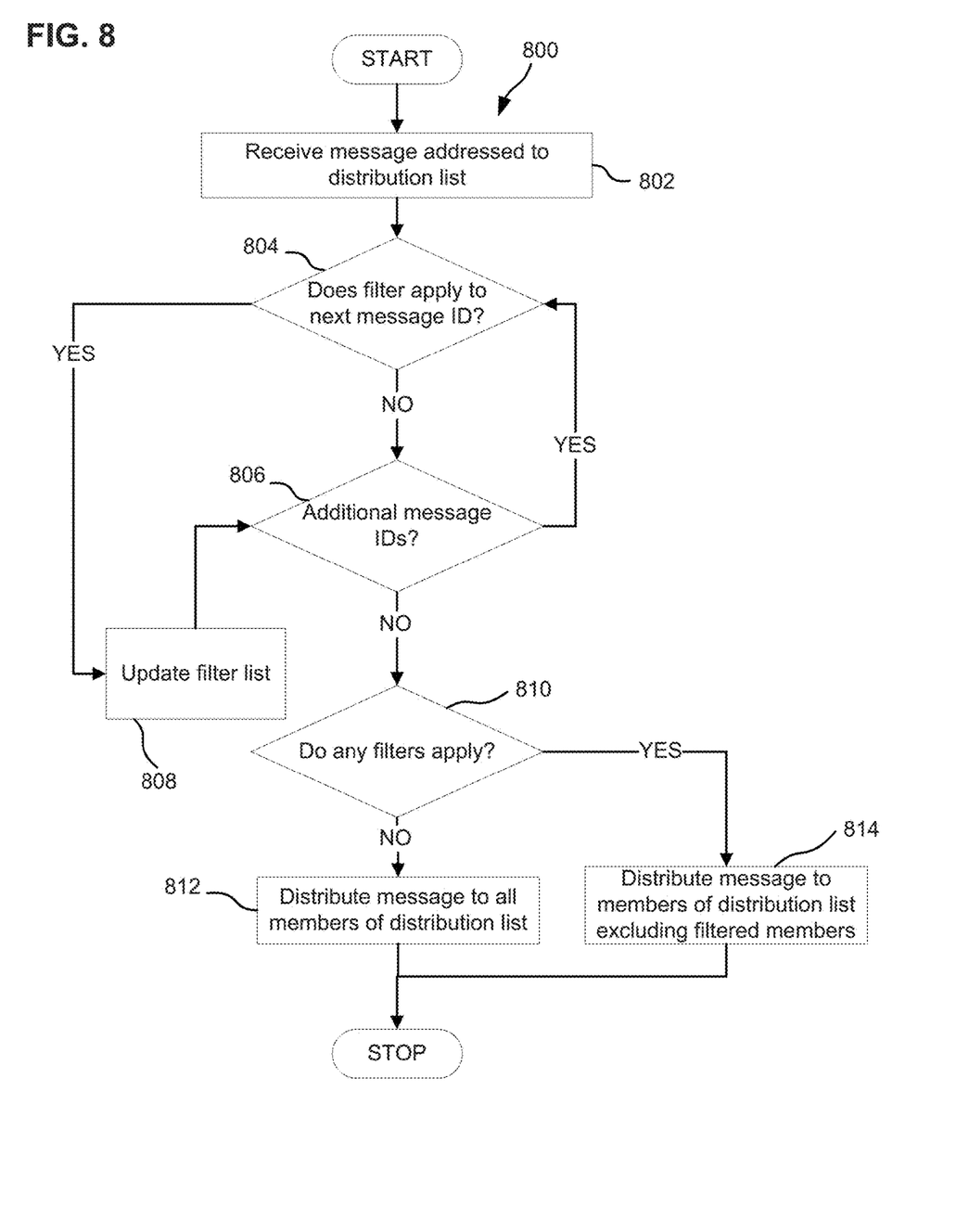
FIG. 8 shows a flowchart for an illustrative process for filtering selective users in a distribution list in accordance with an embodiment.

FIG. 8 shows an illustrative example of a process 800 which may be utilized to selectively exclude users from a distribution list in accordance with an embodiment. The process 800 or any process described herein or variation thereof may be performed under the control of one or more computer systems configured with executable instructions. Executable instructions may be stored collectively on one or more computer-readable storage media. In an embodiment, a message addressed to (or otherwise directed to) a distribution list is received. The message may also be directed to other entities such as other individuals or other distribution lists. In an embodiment, message identifiers associated with a thread of the received message are arranged in sequence and, when a message is received, a determination is made 804 whether a filter applies to the next message identifier. The "next" message identifier may be the first or others of the sequence. Determining whether a filter applies may involve referencing a table, such as a table incorporating features of the table discussed above in connection with FIG. 6.

Returning to FIG. 8, if no filter applies, a determination is made 806 whether there are additional message identifiers, such as by determining whether there are additional message identifiers in a "references" portion of metadata of the message. If a filter does apply to the next message identifier, then a filter list is updated 808. A filter list, in an embodiment, is a list of filters that apply to the message that was received.

In an embodiment, once it is determined that there are no additional message identifiers for the message, a determination is made 810 whether any filters apply. If no filters apply, then the message is distributed 812 to all members of the distribution list. However, if filters do apply, in an embodiment, then the distributed message is distributed 814 to members of the distribution list excluding the filtered members.

Figure 9:
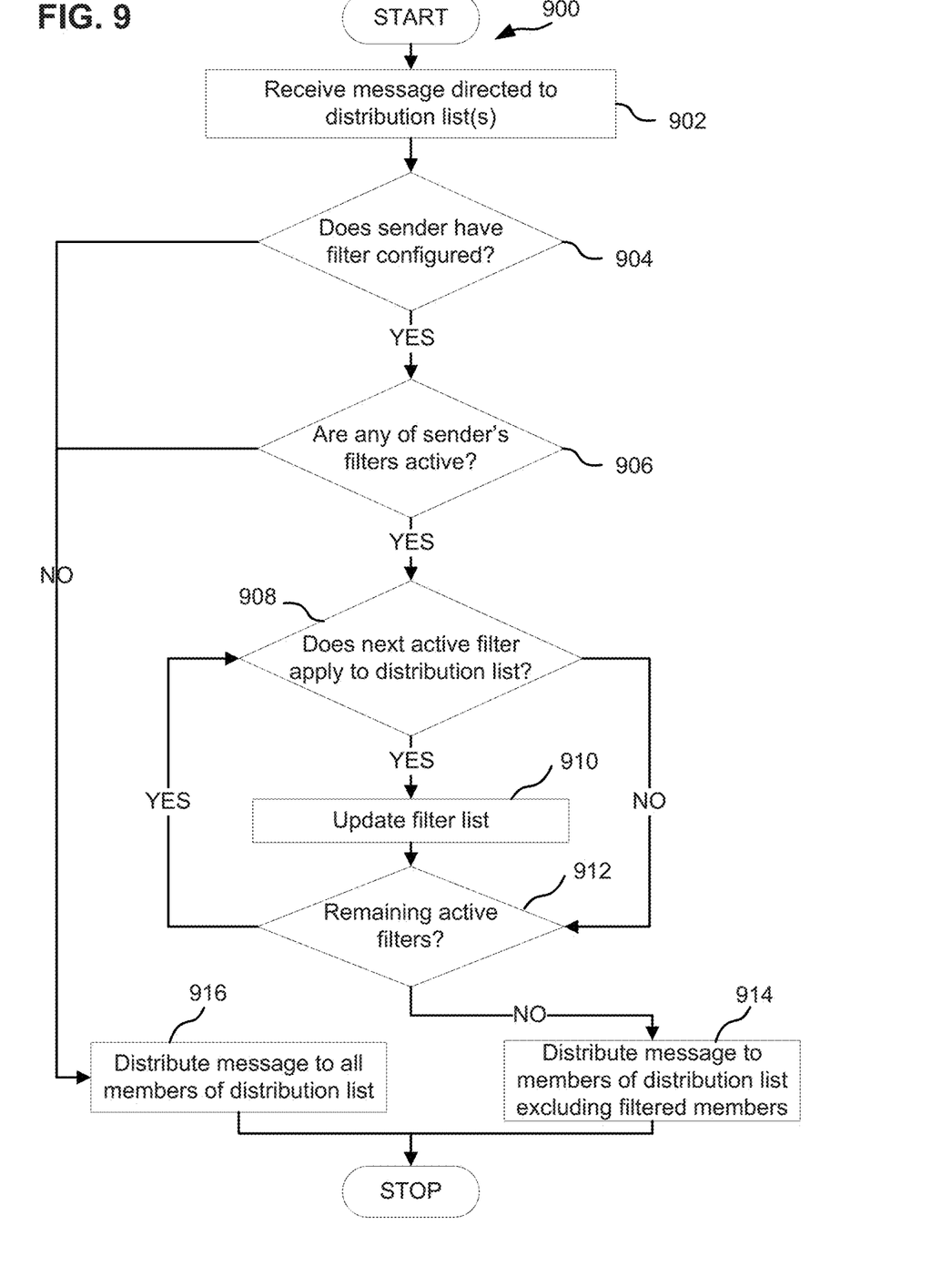
FIG. 9 shows another flowchart for an illustrative process for filtering selective users in a distribution list in accordance with an embodiment.

FIG. 9 shows a process 900 for selectively filtering users from a distribution list. In an embodiment, a message is received 902 that is directed to a distribution list and/or to other entities. A determination is made 904 whether the sender has any filters configured. Determination whether the user has any filters configured may include referencing a table, such as a table having features of the table described above in connection with FIG. 7. Determining whether the sender has any filters configured may be performed by checking a table for each of the distribution lists specified as recipients to the received message. Returning to FIG. 9, in an embodiment, if the sender does have filters configured, then a determination is made 906 whether any of the sender's filters are active. If any of the senders' filters are active, a determination may be made 908 whether the next active filter applies to the distribution list(s) specified in the message, and if the active filter does apply, then a filter list is updated 910.

In an embodiment, once the filter list is updated or a determination is made that the next active filter does not apply to the distribution list(s), a determination is then made 912 whether there are any remaining active filters. If there are remaining active filters, then a determination of whether the next active filter applies to the distribution list is made 908 again. If there are no remaining active filters, then the message is distributed to members of the distribution list excluding the filtered members. Distribution of a message to a member of the distribution list may be done in any suitable manner. In an embodiment, distribution of the message to the member of the distribution list is performed by sending the message, either directly or indirectly, to a computing device operable to receive the message and make the message available to one or more users associated with the member of the distribution list. For instance, distributing the message to a member of the distribution list may include sending the message with information identifying a destination of the message to a server so that the server can forward to another server appropriately. Distribution the message may also include placing the message in an electronic folder associated with the member of the distribution list. In an embodiment, if there are no remaining active filters, in an embodiment, the message is then distributed 914 to members of the distribution list, excluding the filtered members. However, during performance of the process 900, a determination is made that the sender does not have any filters configured or if the sender does have filters configured but none of those filters are active, then the message is distributed 916 to all members of the distribution list, in accordance with an embodiment.

Variations of the techniques described above are contemplated as being within the scope of the present invention. For instance, embodiments described above include storing information about filters in a central location locally on a client device or on a server. In addition or as an alternative to such techniques, information regarding filters may be stored in metadata of electronic messages. The information regarding filters may include information that indicates whether a filter applies to the message, whether the filter applies to a thread of the message, details of the filter, including recipient identifiers to whom a filter applies, whether a filter has been applied to previous messages of the message thread, and the like. In an embodiment, information regarding filters may be encrypted. Encryption of the information may prevent savvy users from viewing the metadata and ascertaining filtered recipients, if such a result is desirable. A suitable device, such as a mail server, may decrypt and process the information, sending the electronic message to appropriate recipients.

Further, while the above description discusses filters in terms of exclusion filters, the techniques described above may be used to provide the user of inclusion filters instead of or in addition to exclusion filters. As an example, an inclusion filter may provide the ability to automatically include user1@example.com and/or distribution_list1@example.com whenever a user sends a message has been addressed to user2@example.com and/or distribution_list2@example.com. Variations of the techniques described above can be used to maintain an inclusion filter across a message thread in a manner similar to how exclusion filters are maintained across a message thread. In addition, variations of the techniques described above can be used to deploy filters (either inclusion filters or exclusion filters) in a corporate or other organizational setting. As an example, tables described above, or variations thereof may include values that specify that for any sender or a specific sender or senders, messages addressed to abc@example.com (which may be an address associated with a distribution list or individual electronic message account) always include or exclude ceo@example.com and/ or distribution_list@example.com. As yet another variation, filters may be triggered on certain specific keywords in subject field or other field of a message. Generally, other variations that retain the user of filers across message threads may be used in accordance with various embodiments.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of distributing electronic messages, comprising:
   maintaining, by a server, at a first table stored on the server, first information relating to a plurality of messages sent by a plurality of senders, each message in the plurality of messages associated with a message identifier of a message sent by a sender of the plurality of senders, each message identifier associated with a distribution list filter specifying one or more members on a distribution list to be excluded from receiving a message corresponding to the message identifier;
   maintaining, at a second table stored on the server, second information relating to the sender of the plurality of senders, the second information for the sender comprising a plurality of distribution lists, a plurality of distribution list filters associated with the plurality of distribution lists, and a filter state associated with each distribution list filter of the plurality of distribution list filters;
   receiving, from a client device, configuration instructions associated with the sender, the configuration instructions specifying a distribution list filter specifying one or more members on a distribution list of the plurality of distribution lists to be excluded from receiving an electronic message;
   based at least in part on the configuration instructions, updating, by the server, the second information stored in the second table for the sender to include the distribution list, the distribution list filter and a filter state associated with the distribution list filter;
   receiving information identifying an attempt to send an electronic message from the sender to a set of members on the distribution list, wherein the electronic message is part of a message thread;
   identifying message identifiers corresponding to one or more additional messages in the message thread;
   determining, based at least in part on the first information stored in the first table, that a message identifier of the message identifiers is associated with the distribution list and a first distribution list filter;
   determining, based at least in part on the second information stored in the second table, that the distribution list is associated with at least a second distribution list filter; and
   based at least in part on the first distribution list filter and the second distribution list filter, distributing, by the server, the electronic message to the set of members on the distribution list excluding the one or more members to whom distribution is to be prevented.

2. The computer-implemented method of claim 1, wherein the electronic message includes metadata identifying the one or more additional messages of the message thread.

3. The computer-implemented method of claim 1, wherein the plurality of distribution list filters specify one or more addresses of respective one or more members of the plurality of distribution lists to whom distribution of the electronic message is to be prevented.

4. The computer-implemented method of claim 1, wherein each of the plurality of distribution list filters is associated with a respective filter state, wherein the respective filter state identifies an active or inactive state of the filter.

5. The computer-implemented method of claim 3, further comprising:
   receiving a reply to the electronic message, the reply being addressed to at least one of the plurality of distribution lists; and
   distributing the reply to members of one of the plurality of distribution lists excluding at least the distribution list to which distribution is to be prevented.

6. The computer-implemented method of claim 1, wherein information identifying at least a first member to whom distribution is to be prevented is included in the distributed electronic message.

7. The computer-implemented method of claim 1, wherein maintaining the first information relating to the plurality of messages includes encoding information identifying at least a first member to be excluded in metadata of the electronic message.

8. The computer-implemented method of claim 1, wherein information identifying at least a first member to whom distribution is to be prevented is not viewable by a recipient of the distributed electronic message.

9. The computer-implemented method of claim 1, wherein a first member to be excluded from receiving the electronic message is determined based at least in part on a keyword identified in a field of the electronic message of the message thread, wherein the field of the electronic message comprises a subject field of the electronic message.

10. The computer-implemented method of claim 1, further comprising determining that a member of the plurality of distribution lists specified by a third distribution list filter is to be included in receiving the electronic message based at least in part on the third distribution list filter being associated with a filter state that is not in an active state.

11. The computer-implemented method of claim 1, further comprising receiving, from the client device and specified via a user control on the client device, the instructions to prevent or allow recipients of the electronic message to see a notification that users have been excluded from distribution of the electronic message without identifying the excluded users.

12. The computer-implemented method of claim 1, further comprising updating, by the server, based at least in part on the configuration instructions, the first information stored in the first table to include a message identifier associated with the electronic message, the distribution list filter specifying the one or more members in the distribution list to be excluded from receiving the electronic message corresponding to the message identifier and a filter type associated with the distribution list filter.

13. One or more non-transitory computer-readable media storing computer-executable instructions executable by one or more processors, the computer-executable instructions comprising:
- instructions that cause the one or more processors to maintain, by a server, at a first table stored on the server, first information relating to a plurality of messages sent by a plurality of senders, each message in the plurality of messages associated with a message identifier of a message sent by a sender of the plurality of senders, each message identifier associated with a distribution list filter specifying one or more members on a distribution list to be excluded from receiving a message corresponding to the message identifier;
- instructions that cause the one or more processors to maintain, at a second table stored on the server, second information relating to the sender of the plurality of senders, the second information for the sender comprising a plurality of distribution lists, a plurality of distribution list filters associated with the plurality of distribution lists, and a filter state associated with each distribution list filter of the plurality of distribution list filters;
- instructions that cause the one or more processors to receive, from a client device, configuration instructions associated with the sender, the configuration instructions specifying a distribution list filter specifying one or more members on a distribution list of the plurality of distribution lists to be excluded from receiving an electronic message;
- based at least in part on the configuration instructions, instructions that cause the one or more processors to update the second information stored in the second table for the sender to include the distribution list, the distribution list filter and a filter state associated with the distribution list filter;
- instructions that cause the one or more processors to receive information identifying an attempt to send an electronic message from the sender to a set of members on the distribution list, wherein the electronic message is part of a message thread;
- instructions that cause the one or more processors to identify message identifiers corresponding to one or more additional messages in the message thread;
- instructions that cause the one or more processors to determine, based at least in part on the first information stored in the first table, that a message identifier of the message identifiers is associated with the distribution list and a first distribution list filter;
- instructions that cause the one or more processors to determine, based at least in part on the second information stored in the second table, that the distribution list is associated with at least a second distribution list filter; and
- based at least in part on the first distribution list filter and the second distribution list filter, instructions that cause the one or more processors to distribute the electronic message to the set of members on the distribution list excluding the one or more members to whom distribution is to be prevented.

14. The computer-readable media of claim 13, wherein the electronic message includes metadata identifying the one or more additional messages of the message thread.

15. The computer-readable media of claim 13, wherein the plurality of distribution list filters specify one or more addresses of respective one or more members of the plurality of distribution lists to whom distribution of the electronic message is to be prevented.

16. A system, comprising:
- memory configured to store computer-executable instructions; and
- at least one processor configured to access the memory and execute the computer-executable instructions to collectively at least:
- maintain, by a server, at a first table stored on the server, first information relating to a plurality of messages sent by a plurality of senders, each message in the plurality of messages associated with a message identifier of a message sent by a sender of the plurality of senders, each message identifier associated with a distribution list filter specifying one or more members on a distribution list to be excluded from receiving a message corresponding to the message identifier;
- maintain, at a second table stored on the server, second information relating to the sender of the plurality of senders, the second information for the sender comprising a plurality of distribution lists, a plurality of distribution list filters associated with the plurality of distribution lists, and a filter state associated with each distribution list filter of the plurality of distribution list filters;
- receive, from a client device, configuration instructions associated with the sender, the configuration instructions specifying a distribution list filter specifying one or more members on a distribution list of the plurality of distribution lists to be excluded from receiving an electronic message;
- based at least in part on the configuration instructions, updating, by the server, the second information stored in the second table for the sender to include the distribution list, the distribution list filter and a filter state associated with the distribution list filter;
- receive information identifying an attempt to send an electronic message from the sender to a set of members on the distribution list, wherein the electronic message is part of a message thread;
- identify message identifiers corresponding to one or more additional messages in the message thread;
- determine, based at least in part on the first information stored in the first table, that a message identifier of the message identifiers is associated with the distribution list and a first distribution list filter;
- determine, based at least in part on the second information stored in the second table, that the distribution list is associated with at least a second distribution list filter; and
- based at least in part on the first distribution list filter and the second distribution list filter, distribute, by the server, the electronic message to the set of members on the distribution list excluding the one or more members to whom distribution is to be prevented.

17. The system of claim 16, wherein each of the plurality of distribution list filters is associated with a respective filter state, wherein the respective filter state identifies an active or inactive state of the filter.

18. The system of claim 16, wherein a respective distribution list filter is triggered in response to a keyword identified in a subject field of the electronic message.

19. The system of claim 16, wherein the at least one processor is configured to execute the computer-executable instructions to determine that a member of the plurality of distribution lists specified by a third distribution list filter is to be included in receiving the electronic message based at least in part on the third distribution list filter being associated with a filter state that is not in an active state.

\* \* \* \* \*

UNITED STATES PATENT AND TRADEMARK OFFICE
CERTIFICATE OF CORRECTION

PATENT NO. : 10,986,056 B2  
APPLICATION NO. : 15/465973  
DATED : April 20, 2021  
INVENTOR(S) : Koul et al.

Page 1 of 1

It is certified that error appears in the above-identified patent and that said Letters Patent is hereby corrected as shown below:

In the Drawings

On sheet 4 of 6, in FIG. 6, Line 4, delete "far@exampe.com" and insert -- far@example.com --, therefor.

In the Specification

In Column 7, Line 43, delete "patents example.com," and insert -- patents@example.com, --, therefor.

In Column 8, Line 24, delete "the" and insert -- to --, therefor.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*